(12) United States Patent
Prasher et al.

(10) Patent No.: US 12,529,153 B2
(45) Date of Patent: Jan. 20, 2026

(54) ELECTROLYZER SYSTEM INCLUDING A HEAT PUMP AND METHOD OF OPERATING THEREOF

(71) Applicant: BLOOM ENERGY CORPORATION, San Jose, CA (US)

(72) Inventors: Ravi Prasher, Danville, CA (US); K.R. Sridhar, Los Gatos, CA (US); Michael Petrucha, Santa Clara, CA (US); David Weingaertner, Sunnyvale, CA (US)

(73) Assignee: BLOOM ENERGY CORPORATION, San Jose, CA (US)

(*) Notice: Subject to any disclaimer, the term of this patent is extended or adjusted under 35 U.S.C. 154(b) by 0 days.

(21) Appl. No.: 18/950,977

(22) Filed: Nov. 18, 2024

(65) Prior Publication Data
US 2025/0163594 A1    May 22, 2025

Related U.S. Application Data

(60) Provisional application No. 63/601,374, filed on Nov. 21, 2023.

(51) Int. Cl.
*C25B 9/60* (2021.01)
*C25B 1/042* (2021.01)
*C25B 9/67* (2021.01)
*C25B 9/77* (2021.01)
*C25B 15/021* (2021.01)
*C25B 15/08* (2006.01)

(52) U.S. Cl.
CPC ............... *C25B 9/67* (2021.01); *C25B 1/042* (2021.01); *C25B 9/77* (2021.01); *C25B 15/021* (2021.01); *C25B 15/08* (2013.01)

(58) Field of Classification Search
CPC .. C25B 9/67; C25B 1/042; C25B 9/77; C25B 15/021; C25B 15/08
See application file for complete search history.

(56) References Cited

U.S. PATENT DOCUMENTS

| | | | |
|---|---|---|---|
| 7,067,208 B2 | 6/2006 | Gottmann et al. | |
| 7,201,979 B2 | 4/2007 | McElroy et al. | |
| 7,364,810 B2 | 4/2008 | Sridhar et al. | |
| 7,575,822 B2 | 8/2009 | Mitlitsky et al. | |
| 11,309,553 B2 | 4/2022 | Ballantine et al. | |
| 11,456,474 B2 | 9/2022 | Ballantine et al. | |
| 2003/0157386 A1 | 8/2003 | Gottmann et al. | |
| 2004/0191595 A1 | 9/2004 | McElroy et al. | |
| 2005/0048334 A1 | 3/2005 | Sridhar et al. | |
| 2018/0287179 A1* | 10/2018 | Rueger | C25B 15/02 |

(Continued)

OTHER PUBLICATIONS

Deboer, R. et al., "Strengthening Industrial Heat Pump Innovation: Decarbonizing Industrial Heat," Jul. 10, 2020, https://www.sintef.no/globalassets/sintef-energi/industrial-heat-pump-whitepaper/2020-07-10-whitepaper-ihp-a4.pdf).

(Continued)

*Primary Examiner* — Zulmariam Mendez
(74) *Attorney, Agent, or Firm* — THE MARBURY LAW GROUP PLLC

(57) ABSTRACT

An electrolyzer system includes stacks of electrolyzer cells configured receive steam and air, and output a hydrogen product stream and an oxygen exhaust stream, and a first heat pump configured to extract heat from the oxygen exhaust stream to generate a first portion of the steam provided to the stacks.

20 Claims, 5 Drawing Sheets

(56) References Cited

U.S. PATENT DOCUMENTS

2020/0212459 A1 7/2020 Ballantine et al.
2021/0020974 A1 1/2021 Ballantine et al.
2022/0372636 A1 11/2022 Weingaertner et al.

OTHER PUBLICATIONS

EPO Office Communication, Extended European Search Report for European Patent Application No. 24213539.0, dated Jul. 11, 2025, 8 pages.

\* cited by examiner

ELECTROLYZER SYSTEM INCLUDING A HEAT PUMP AND METHOD OF OPERATING THEREOF

FIELD

The present disclosure is directed to electrolyzer cell systems including at least one heat pump for thermal energy recovery and method of operating thereof.

BACKGROUND

In a solid oxide electrolyzer cell (SOEC), a cathode electrode is separated from an anode electrode by a solid oxide electrolyte. When a SOEC is used to produce hydrogen through electrolysis, a positive potential is applied to the air side of the SOEC and oxygen ions are transported from the fuel (e.g., steam) side to the air side. Throughout this specification, the SOEC anode will be referred to as the air electrode, and the SOEC cathode will be referred to as the fuel electrode. During SOEC operation, water (e.g., steam) in the fuel stream is reduced ($H_2O + 2e^- \rightarrow O^{2-} + H_2$) to form $H_2$ gas and $O^{2-}$ ions, the $O^{2-}$ ions are transported through the solid electrolyte, and then oxidized (e.g., by an air inlet stream) on the air side ($O^{2-}$ to $O_2$) to produce molecular oxygen (e.g., oxygen enriched air).

SUMMARY

In various embodiments, an electrolyzer system includes stacks of electrolyzer cells configured receive steam and air, and output a hydrogen product stream and an oxygen exhaust stream. The electrolyzer system also includes a first heat pump configured to extract heat from the oxygen exhaust stream to generate a first portion of the steam provided to the stacks.

In various embodiments, a method of operating an electrolyzer system comprises providing steam and air to stacks of electrolyzer cells to generate a hydrogen product steam and an oxygen exhaust stream; providing the oxygen exhaust stream and liquid water to a first heat pump; and extracting heat from the oxygen exhaust stream in the first heat pump to generate a first portion of the steam provided to the stacks.

FIGURES

DETAILED DESCRIPTION

The various embodiments will be described in detail with reference to the accompanying drawings. The drawings are not necessarily to scale and are intended to illustrate various features of the invention. Wherever possible, the same reference numbers will be used throughout the drawings to refer to the same or like parts. References made to particular examples and implementations are for illustrative purposes and are not intended to limit the scope of the invention or the claims.

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

Figure 1A:
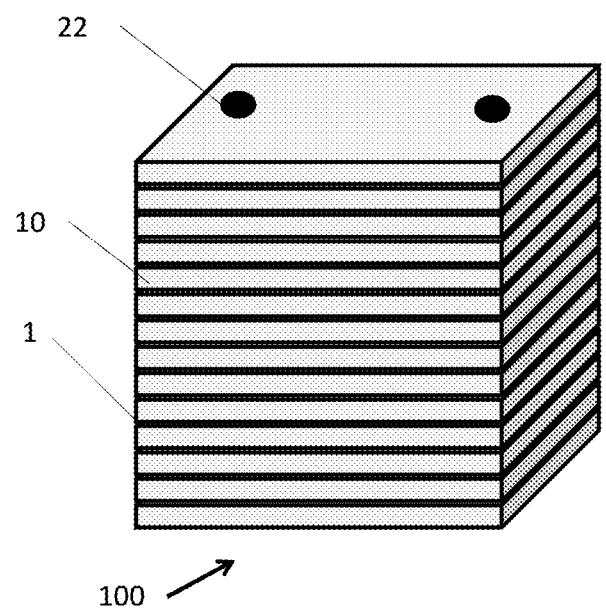
FIG. 1A is a perspective view of a solid oxide electrolyzer cell (SOEC) stack.
Figure 1B:
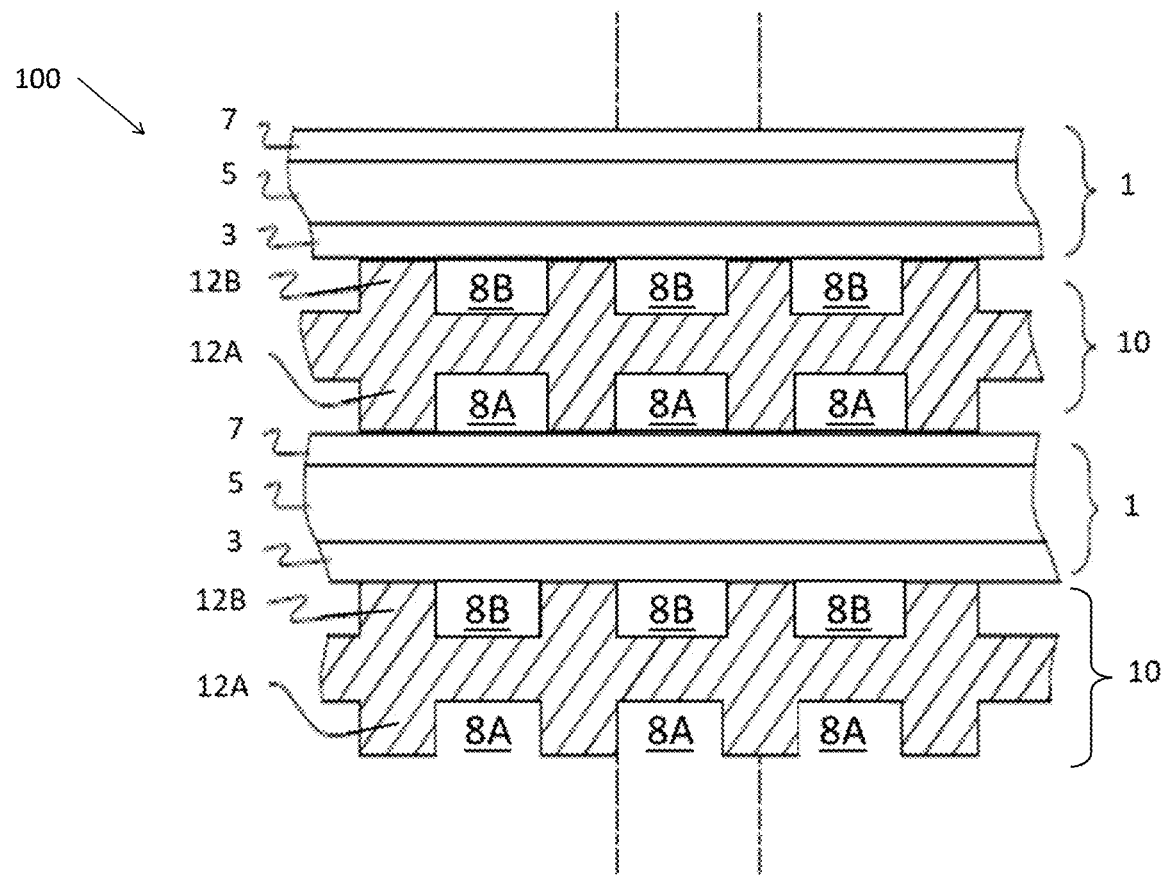
FIG. 1B is a side cross-sectional view of a portion of the stack of FIG. 1A.

FIG. 1A is a perspective view of an electrolyzer cell stack 100, such as a solid oxide electrolyzer cell (SOEC) stack, and FIG. 1B is a side cross-sectional view of a portion of the stack 100 of FIG. 1A. Referring to FIGS. 1A and 1B, the stack 100 includes multiple electrolyzer cells 1 that are separated by interconnects 10, which may also be referred to as gas flow separator plates or bipolar plates. Each electrolyzer cell 1 includes an air electrode 3, an electrolyte 5, such as a solid oxide electrolyte for a SOEC, and a fuel electrode 7. The stack 100 also includes internal fuel riser channels 22.

Various materials may be used for the air electrode 3, electrolyte 5, and fuel electrode 7. For example, the air electrode 3 may comprise an electrically conductive material, such as an electrically conductive perovskite material, such as lanthanum strontium manganite (LSM). Other conductive perovskites, such as LSCo, etc., or metals, such as Pt, may also be used. The electrolyte 5 may comprise a stabilized zirconia, such as scandia stabilized zirconia (SSZ) or yttria stabilized zirconia (YSZ), yttria-ceria-stabilized zirconia (YCSZ), ytterbia-ceria-scandia-stabilized zirconia (YbCSSZ) or blends thereof. In YbCSSZ, scandia may be present in an amount equal to 9 to 11 mol %, such as 10 mol %, ceria may present in amount greater than 0 and equal to or less than 3 mol %, for example 0.5 mol % to 2.5 mol %, such as 1 mol %, and ytterbia may be present in an amount greater than 0 and equal to or less than 2.5 mol %, for example 0.5 mol % to 2 mol %, such as 1 mol %, as disclosed in U.S. Pat. No. 8,580,456, which is incorporated herein by reference. Alternatively, the electrolyte 5 may comprise another ionically conductive material, such as a doped ceria. The fuel electrode 7 may comprise a cermet comprising a nickel containing phase and a ceramic phase. The nickel containing phase may consist entirely of nickel in a reduced state. The ceramic phase may comprise a stabilized zirconia, such as yttria and/or scandia stabilized zirconia and/or a doped ceria, such as gadolinia, yttria and/or samaria doped ceria. The electrodes and the electrolyte may each comprise one or more sublayers of one or more of the above described materials.

Each interconnect 10 electrically connects adjacent electrolyzer cells 1 in the stack 100. In particular, an interconnect 10 may electrically connect the fuel electrode 7 of one electrolyzer cell 1 to the air electrode 3 of an adjacent electrolyzer cell 1. FIG. 1B shows that the lower electrolyzer cell 1 is located between two interconnects 10.

Each interconnect 10 includes fuel ribs 12A that at least partially define fuel channels 8A, and air ribs 12B that at least partially define air channels 8B. The interconnect 10 may operate as a gas-fuel separator that separates a fuel, such as steam, flowing to the fuel electrode 7 of one electrolyzer cell 1 in the stack 100 from oxidant, such as air, flowing to the air electrode 3 of an adjacent electrolyzer cell 1 in the stack 100. At either end of the stack 100, there may be an air end plate or fuel end plate (not shown) for providing air or fuel, respectively, to the end electrode. Alternatively, the air end plate or fuel end plate may comprise the same interconnect structure used throughout the stack.

Each interconnect 10 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 10 may comprise a metal (e.g., a chromium-iron alloy, such as 4-6 weight percent iron, optionally 1 or less weight percent yttrium and balance chromium alloy). Alternatively, any other suitable conductive interconnect material may be used, such as stainless steel (e.g., ferritic stainless steel, SS446, SS430, etc.) or iron-chromium alloy (e.g., Crofer™ 22 APU alloy which contains 20 to 24 wt. % Cr, less than 1 wt. % Mn, Ti and La, and balance Fe, or ZMG™ 232L alloy which contains 21 to 23 wt. % Cr, 1 wt. % Mn and less than 1 wt. % Si, C, Ni, Al, Zr and La, and balance Fe).

Figure 2A:
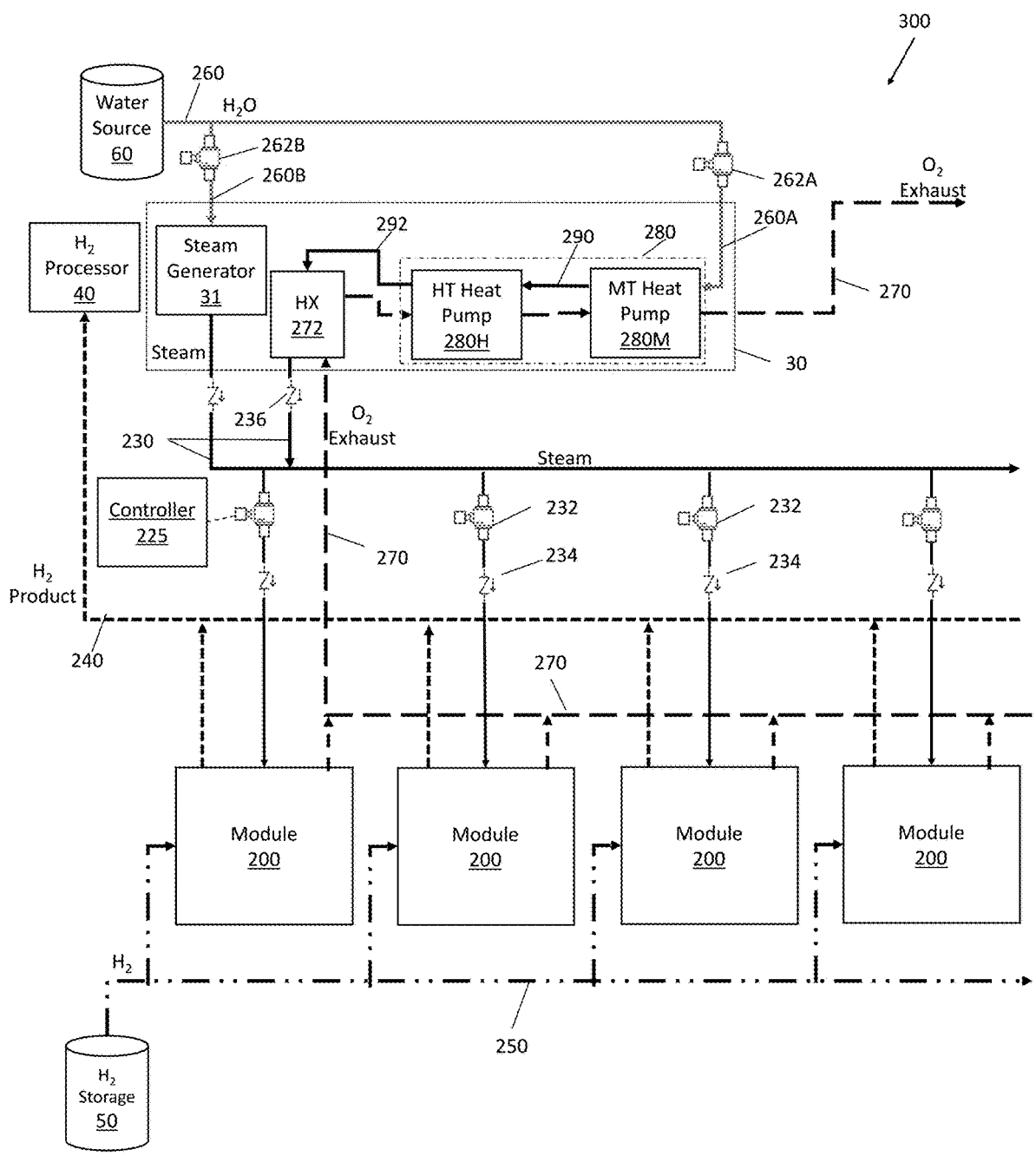
FIG. 2A is a schematic view of an electrolyzer system, according to various embodiments of the present disclosure.
Figure 2B:
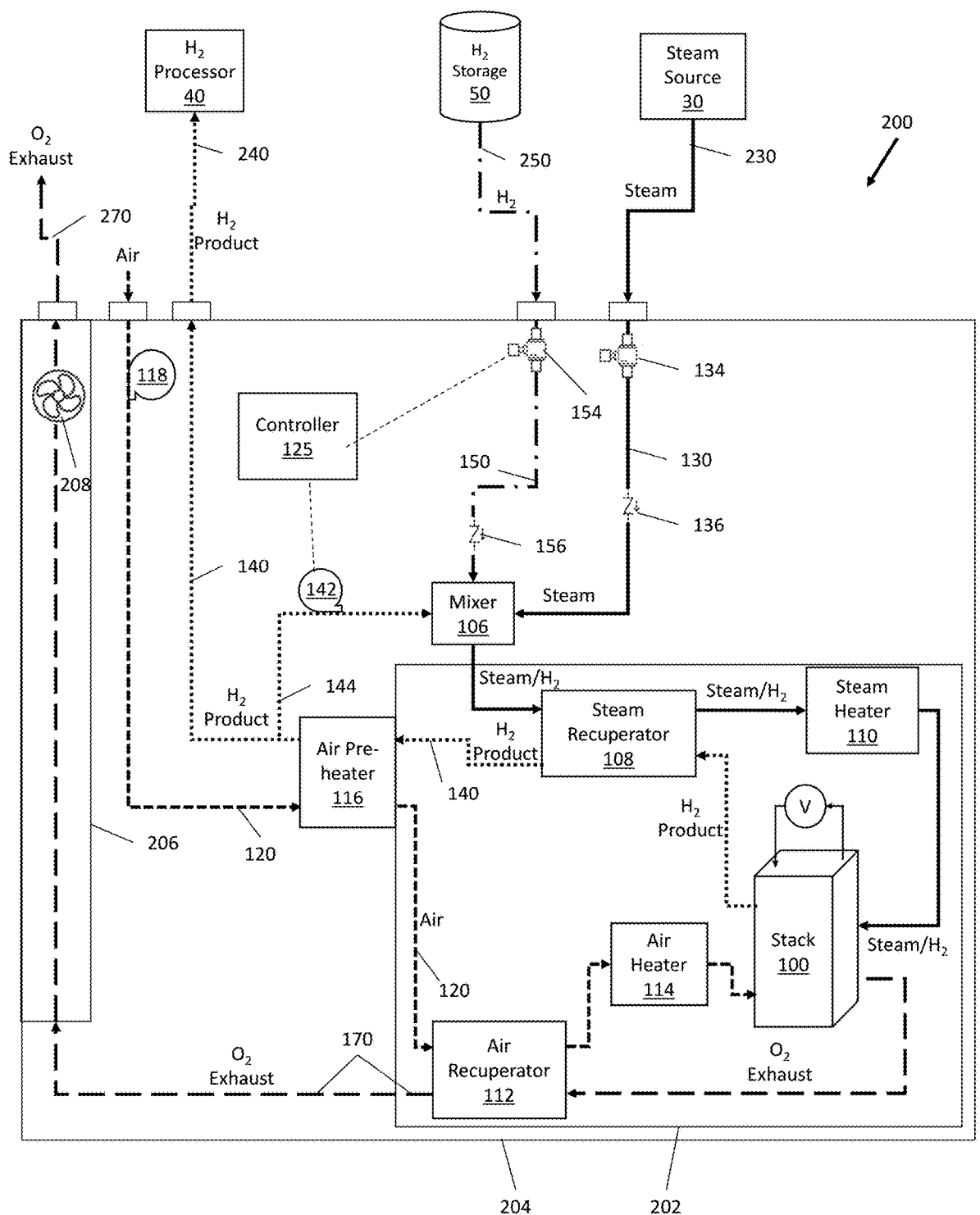
FIG. 2B is a schematic view showing an electrolyzer module of the system of FIG. 2A.

FIG. 2A is a schematic view showing an electrolyzer system 300, and FIG. 2B is a schematic view an electrolyzer module 200 of the electrolyzer system 300, according to various embodiments of the present disclosure. Referring to FIGS. 1A, 1B, 2A and 2B, the system 300 may include multiple fluidly connected modules 200. The modules 200 may comprise electrolyzer modules (e.g., hydrogen generation modules) which generate a hydrogen product from electrolysis of water (e.g., steam). While four modules 200 are shown, the system 300 may include any suitable number of modules 200. The system 300 may include a steam conduit (e.g., a pipe, header or manifold) 230 configured to fluidly connect each module 200 to at least one steam source 30, a product conduit (e.g., a pipe, header or manifold) 240 configured to fluidly connect each module 200 to a hydrogen processor 40, a hydrogen conduit (e.g., a pipe, header or manifold) 250 configured to fluidly connect each module 200 to a hydrogen storage vessel (e.g., hydrogen tank) 50, a water conduit (e.g., a pipe, header or manifold) 260 fluidly connecting the at least one steam source 30 to a water source 60, and an exhaust conduit (e.g., a pipe, header or manifold) 270 configured to receive oxygen exhaust from the modules 200. The hydrogen processor 40 may comprise any component which may compress and/or store the hydrogen product, such as a mechanical compressor, an electrochemical hydrogen separator (e.g., a proton exchange membrane), and/or a hydrogen storage vessel.

The system 300 may also include various flow control elements to control fluid flow to and from the modules 200. For example, the system may include steam valves 232 and non-return valves 234 configured to control steam flow from the steam conduit 230 to the modules 200. The system 300 may also include a system controller 225 which controls the steam valves 232 and other system level components (e.g., other valves, etc.).

The system controller 225 may include a central processing unit and a memory. The system controller 225 may be wired or wirelessly connected to various elements of the system 300, and may be configured to control the same. The system controller may communicate and/or receive signals from sensors located on various components of the system 300 or from other controllers located in different modules, such as modules 200. Sensors may measure the temperature of stack components, voltage or current measurements, pressure in various conduits, the state of various valves, and the status of various modules (such as the operational status of the hydrogen processor 40, etc.). In addition, the system controller 225 may be configured to control the various valves and the operation of the modules 200. In one embodiment, the system controller 225 may be located in a power module which includes a housing separate from the housings of the electrolyzer modules 200. The power module may also include an AC/DC rectifier configured to convert alternating current (AC) power from a power source (e.g., power grid) to direct current (DC) power provided to the electrolyzer modules 200. The remaining components of the system 300 may be located either in a gas distribution module which includes a housing separate from the housings of the electrolyzer modules 200 and the power module, and/or outside the module housings of the system 300. For example, the at least one steam source 30 and/or the hydrogen processor 40 may be located in the gas distribution module or separate from the module housings of the system 300. Likewise, the steam conduit 230 may extend from the gas distribution module to the electrolyzer modules 200 in or over a common base supporting the gas distribution module and the electrolyzer modules 200.

Referring to FIG. 2B, each module 200 may include an electrolyzer cell stack 100 including multiple electrolyzer cells 1, such as solid oxide electrolyzer cells (SOECs), as described with respect to FIGS. 1A and 1B. The stack 100 may be located in an electrolyzer cell column including plural stacks. Alternatively, the column may contain only a single stack 100. The module 200 may also include a steam recuperator heat exchanger 108, at least one steam heater 110, an air recuperator heat exchanger 112, and at least one air heater 114. The module 200 may also include an optional mixer 106, an optional air preheater/product cooler heat exchanger 116 and an optional stack heater (not shown for clarity).

The module 200 may include a hotbox 202 to house various components, such as the stack 100, the steam recuperator 108, the steam heater 110, the air recuperator 112, and/or air the heater 114. In some embodiments, the hotbox 202 may include multiple stacks 100 and/or columns of stacks. The module 200 may also include a cabinet 204 configured to house the hotbox 202 and other module 200 components located outside of the hotbox 202. Optionally, the module 200 may also include a controller 125, such as a central processing unit, which is configured to control the operation of the module 200. For example, the controller 125 may be wired or wirelessly connected to various elements of the module 200 to control the same. Alternatively, the controller 125 may be located outside the housing of the electrolyzer module 200 (e.g., in the power module of the system 300). The air preheater/product cooler heat exchanger 116 can be located inside the hotbox 202, or it can be located outside of the hotbox 202.

During operation, the stack 100 may be provided with steam from the steam source 30 and may be provided with electric power (e.g., DC current or voltage) from an external power source, such as a power grid. In particular, the steam may be provided to the fuel electrodes 7 of the electrolyzer cells 1 of the stack 100, and the power source may apply a voltage between the fuel electrodes 7 and the air electrodes 3, in order to electrolyze water molecules at the fuel electrodes 7 to form hydrogen gas and oxygen ions. In SOECs 1, the oxygen ions are transported through the solid electrolyte 5 to the air electrodes 3. Air may optionally be provided to the air electrodes 3 of the stack 100, in order to sweep the oxygen from the air electrodes 3. The stack 100 may output a hydrogen stream (e.g., hydrogen product which may also contain residual steam) into a module product conduit 140, and an oxygen-rich exhaust stream (e.g., an oxygen exhaust stream), such as an oxygen-rich air stream (i.e., oxygen enriched air) into a module exhaust conduit 170.

The steam output from the at least one steam source 30 may be provided to the multiple electrolyzer modules 200 via the system steam conduit 230. The steam entering the module 200 may be provided to the steam recuperator 108 via a module steam conduit 130. In particular, the steam may include small amounts of dissolved air and/or oxygen. As such, the steam from the module steam conduit 130 may be mixed with hydrogen gas in the mixer 106, in order to maintain a reducing environment in the stack 100, and in particular, at the fuel electrodes 7. An optional shutoff valve 134 and an optional non-return valve 136 may be located on module steam conduit 130. The non-return valve 136 is configured to prevent the backflow of steam from the module steam conduit 130 into the steam conduit 230. However, in some embodiments, the non-return valve 136 may be omitted. For example, operation of the shutoff valve 134 may be sufficient to prevent steam backflow. A module hydrogen conduit 150 may provide the hydrogen from the hydrogen storage vessel 50 and the system hydrogen conduit 250 to the mixer 106. An optional shutoff valve 154 and an optional non-return valve 156 may be located on module hydrogen conduit 150.

The mixer 106 may be configured to mix the steam with hydrogen received from a hydrogen storage vessel 50 and/or with a portion of the hydrogen product stream generated by the stack 100 and recycled into the mixer 106 by a recycle blower 142 located on a module recycling conduit 144 which fluidly connects the module product conduit 140 to the mixer 106. The hydrogen addition rate may be set to provide an amount of hydrogen that exceeds an amount of hydrogen needed to react with an amount of oxygen dissolved in the steam. The hydrogen addition rate may either be fixed or set to a constant water to hydrogen ratio. However, if the steam is formed using water that is fully deaerated, the mixer 106 and/or hydrogen addition may optionally be omitted.

In some embodiments, the hydrogen may be provided by the external hydrogen storage vessel 50 during system startup and shutdown. For example, during the system 300 startup and/or shutdown modes, hydrogen may be provided from the hydrogen storage vessel 50 to the module steam conduit 130 via the hydrogen conduit 250 and module hydrogen conduit 150. In contrast, during the steady-state operation mode, a portion of the hydrogen product (i.e., hydrogen exhaust stream) may be diverted from the module product conduit 140 to the module steam conduit 130 via the recycling conduit 144, and the hydrogen flow from the hydrogen storage vessel 50 may be stopped by closing the shutoff valve 154 on the module hydrogen conduit 150.

The steam recuperator 108 may be a heat exchanger configured to recover heat from the hydrogen stream output from the stack 100 into the module product conduit 140. The steam may be heated to at least 600° C., such as 620° C. to 780° C. (depending in part on the stack 100 operating temperature) in the steam recuperator 108.

The steam output from the steam recuperator 108 may be provided to the steam heater 110 which is located downstream from the steam recuperator 108 on the module steam conduit 130, as shown in FIG. 2B. The steam heater 110 may include a heating element, such as a resistive or inductive heating element. The steam heater 110 may be configured to heat the steam to a temperature above the operating temperature of the stack 100. For example, depending on the health of the stack 100, the water utilization rate of the stack 100, and the air flow rate to the stack 100, the steam heater 110 may heat the steam to a temperature ranging from about 700° C. to about 850° C., such as 720° C. to 780° C. Accordingly, the stack 100 may be provided with steam or a steam-hydrogen mixture at a temperature that allows for efficient hydrogen generation. Heat may also be transported directly from the steam heater to the stack by radiation (i.e., by radiant heat transfer).

If the stack operating current is sufficiently high to maintain the stack at a desired steady-state operating temperature, then the steam heater and/or the air heater may be turned off. In some embodiments, the steam heater 110 may include multiple steam heater zones with independent power levels (divided vertically or circumferentially or both), in order to enhance thermal uniformity.

An air blower 118 may provide an air inlet stream to the air recuperator 112 via a module air inlet conduit 120. The module air inlet conduit 120 fluidly connects the air blower 118 to an air inlet of the stack 100 through the air preheater/product cooler heat exchanger 116. The oxygen exhaust output from the stack 100 may be provided via the module exhaust conduit 170 to the air recuperator 112. The air recuperator 112 may be configured to heat the air inlet stream using heat extracted from the oxygen exhaust.

Air output from the air recuperator 112 may be provided to the air heater 114 via a continuation of the module air inlet conduit 120 inside the hotbox. The air heater 114 may include a resistive or inductive heating element configured to heat the air to a temperature exceeding the operating temperature of the stack 100. For example, depending on the health of the stack 100, the water utilization rate of the stack 100, and the air flow rate to the stack 100, the air heater 114 may heat the air to a temperature ranging from about 700° C. to about 850° C., such as 720° C. to 880° C. Accordingly, the stack 100 may be provided with air at a temperature that allows for efficient hydrogen generation. Heat may also be transferred directly from the air heater to the stack by radiation.

In some embodiments, the air heater 114 may include multiple air heater zones with independent power levels (divided vertically or circumferentially or both), in order to enhance thermal uniformity. Air from the air heater 114 is provided to the air electrodes 3 of the stack 100.

Oxygen exhaust (e.g., oxygen enriched air) output from the air recuperator 112 may be provided to the exhaust conduit (i.e., the system exhaust conduit) 270 via the module exhaust conduit 170 and an exhaust duct 206 of the cabinet 204. A fan 208 or multiple fans 208 may optionally be located in the exhaust duct 206 to improve oxygen exhaust flow through the system exhaust conduit 270. The system exhaust conduit 270 may be configured to receive oxygen exhaust output from multiple modules 200. In some embodiments, the system exhaust conduit 270 may provide the exhaust to a chimney or may provide the air exhaust to the atmosphere. In other embodiments, the oxygen exhaust (e.g., oxygen enriched air) may be provided from the system exhaust conduit 270 for purification and/or use. In some embodiments, the cabinet 204 may contain a cabinet ventilation fan that comprises the fan 208 or another fan in addition to the fan 208. The cabinet ventilation stream may be merged with the oxygen exhaust stream to lower the temperature and oxygen concentration of the oxygen exhaust stream before exhausting it to the atmosphere.

In some embodiments, the module 200 may include an optional air preheater/product cooler heat exchanger 116, which may be located outside (e.g., on top of) of the hotbox 202 or inside of the hotbox 202. The air preheater/product cooler heat exchanger 116 may be fluidly connected to the system hydrogen product conduit 240 by the module product conduit 140. The air preheater/product cooler heat exchanger 116 may be configured to preheat the air inlet stream provided to the hotbox 202 via the module air inlet conduit 120 using heat from the hydrogen product in the module product conduit 140, and to cool a hydrogen product output from the stack 100 using the air inlet stream provided from the air blower 118.

The hydrogen product stream is output from the steam recuperator 108 and the optional air preheater/product cooler heat exchanger 116 via the module product conduit 140 and the system product conduit 240 at a temperature of 100° C. to 200° C. The hydrogen product stream may be compressed and/or purified in the hydrogen processor 40, which may include a hydrogen pump (e.g., proton exchange membrane electrochemical pump) that operates at a temperature of from about 40° C. to about 120° C., in order to remove from about 70% to about 90% of the hydrogen from the hydrogen product stream. A remaining a water rich stream comprises an unpumped effluent from the hydrogen pump.

In various embodiments, the hydrogen processor 40 may include at least one electrochemical hydrogen pump, liquid ring compressor, diaphragm compressor or combination thereof. For example, the hydrogen processor may include a series of electrochemical hydrogen pumps, which may be located in series and/or in parallel with respect to a flow direction of the hydrogen stream, in order to compress the hydrogen stream. Electrochemical compression may be more electrically efficient than traditional compression. The final product from compression may still contain traces of water. As such, the hydrogen processor 40 may include a dewatering device, such as a temperature swing adsorption reactor or a pressure swing adsorption reactor, to remove this residual water, if necessary. The system may be configured to re-purify (e.g., in DI beds) the residual water and provide the residual water removed from the compressed hydrogen stream to the steam source 30 (FIG. 1).

Oxygen exhaust may be output from the modules 200 at a high temperature, such as a temperature ranging from about 200° C. to about 250° C. Recovering this heat may improve the efficiency of the system 300. For example, utilizing this heat energy to generate steam may reduce overall system energy consumption. A heat exchanger may be used to extract heat from the oxygen exhaust and generate steam. However, steam generation efficiency of a heat exchanger drops significantly as the oxygen exhaust temperature approaches 100° C. In particular, at oxygen exhaust temperatures below about 120° C., steam generation using a heat exchanger is generally considered to be impractical.

The present inventors determined that at least one heat pump 280 may comprise at least a portion of the at least one steam source 30 of system 300 to generate at least a portion of the steam for the stacks 100. The at least one heat pump 280 may use heat from the oxygen exhaust (i.e., oxygen rich air) output from the stacks 100 to generate heat for vaporizing water. A heat pump can be used to reduce the amount of energy used for heating and vaporizing water to be used as the steam inlet stream.

Figure 2C:
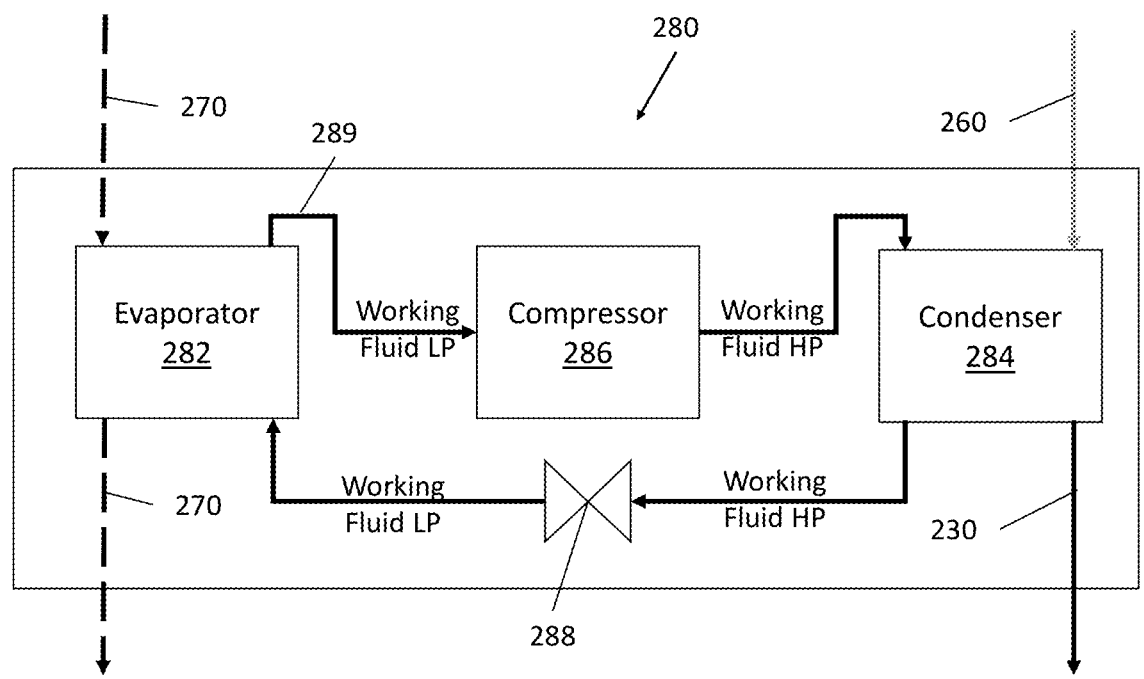
FIG. 2C is a schematic view of a heat pump that may be included in the electrolyzer system of FIG. 2A.

As shown in FIG. 2C, a heat pump 280 may include an evaporator heat exchanger 282, a condenser heat exchanger or 284, a compressor 286, and an expansion valve 288. In operation, a working fluid (e.g., refrigerant) is circulated through one or more conduits 289 of the heat pump and undergoes various state changes and process states.

The air exhaust from the system exhaust conduit 270 (or a branch thereof) is provided into the evaporator heat exchanger 282 to exchange heat with the working fluid in the evaporator 282. Waste heat from the oxygen exhaust is transferred to the working fluid in the evaporator 282, transforming the working fluid from a liquid to a low pressure vapor.

The low pressure working fluid vapor is provided from the evaporator 282 into the compressor 286. The compressor 286 compresses the low working fluid vapor received from the evaporator 282 and outputs a high temperature, high pressure working fluid vapor. The compressor 286 is an electrically powered device which converts external electric power into mechanical work.

The high temperature and high pressure vapor working fluid is provided from the compressor 286 to the condenser heat exchanger 284. The high temperature, high pressure vapor working fluid is converted to a high pressure liquid in the condenser heat exchanger 284 and releases heat to the liquid water provided from the water conduit 260 (or a branch thereof) to the condenser heat exchanger 284. The heat at least partially vaporizes water to steam. The steam is output from the condenser heat exchanger 284 to the steam conduit 230 (or a branch thereof).

The high-pressure liquid working fluid is provided from the condenser heat exchanger 284 to the expansion valve 288, where the working fluid pressure is reduced to provide a low pressure liquid working fluid. The low pressure liquid working fluid is provided from the expansion value 288 to the evaporator heat exchanger 282, and the process repeats.

Thus, the system exhaust conduit 270 is fluidly connected to the input and the output of the hot side of the evaporator heat exchanger 282, the water conduit 260 is fluidly connected to the input of the cold side of the condenser heat exchanger 284, and the steam conduit 230 is fluidly connected to the output of the cold side of the condenser heat exchanger 284. The heat pump conduit(s) 289 are fluidly connected to the input and the output of the cold side of the evaporator heat exchanger 282 and to the input and the output of the hot side of the condenser heat exchanger 284.

Even though a heat pump 280 uses external electric power to generate heat which is used to vaporize water, the amount of electric power is lower than the amount of electric power needed to vaporize the same amount of water using a resistive evaporator. A ratio of the heat output to the electrical energy input is known as the coefficient of performance (COP). Therefore, using a heat pump 280 with a COP of about 2 instead of a resistive evaporator to generate steam reduces the amount of electric power (i.e., electricity) needed to generate steam by about 50%.

Referring again to FIGS. 2A-2C, the at least one steam source 30 of the system 300 may include a heat exchanger 272 and at least one heat pump 280, which may be fluidly connected to the system exhaust conduit 270, the system water conduit 260 and the system steam conduit 230. The heat exchanger 272 may be configured to generate steam by directly transferring heat from the high temperature (e.g., from about 200° C. to about 250° C.) oxygen exhaust received from the system exhaust conduit 270 to liquid water and/or steam received from the at least one heat pump 280. The heat exchanger 272 may cool oxygen exhaust to a temperature ranging from about 110° C. to about 130° C., such as from about 115° C. to about 125° C., or about 120° C.

As shown in FIG. 2A, the at least one heat pump 280 may include a high-temperature first heat pump 280H and an optional medium-temperature second heat pump 280M. However, the present disclosure is not limited to any particular number of heat pumps and additional heat pumps or only one heat pump may be used. The first heat pump 280H may cool the oxygen exhaust provided from the heat exchanger 272 to a temperature ranging from about 70° C. to about 90° C., such as from about 75° C. to about 85° C., or about 80° C. The second heat pump 280M may cool the oxygen exhaust to a temperature ranging from about 30° C. to about 50° C., such as from about 35° C. to about 45° C., or about 40° C. In some embodiments, the working fluid of each heat pump 280H and 280M may be optimized to operate using oxygen exhaust of a particular temperature or temperature range.

The liquid water from the system water conduit 260 is provided into the at least one heat pump 280 via a first branch 260A. A first valve 262A may be located on the first branch 260A to control an amount of water flowing into the at least one heat pump 280. The liquid water may be room temperature water or preheated liquid water having a temperature of less than 80° C. If two or more heat pumps are present, then the liquid water is first provided into the lower temperature second heat pump (e.g., the medium temperature heat second heat pump) 280M. The water is preheated in the second heat pump 280M to any suitable temperature, such as from about 80° C. to about 100° C.

The preheated liquid water is provided from the second heat pump 280M to the higher temperature first heat pump (e.g., the high temperature first heat pump) 280H. For example, the preheated water may be provided from an output of the cold side of the condenser heat exchanger 284 of the second heat pump 280M to the input of the cold side of the condenser heat exchanger 284 of the first heat pump 280H via a connecting conduit 290. The preheated water is further heated and/or at least partially evaporated in the first heat pump 280H to any suitable temperature, such as from about 110° C. to about 130° C. In one embodiment, the preheated water is not evaporated into steam. In another embodiment, the preheated water is partially evaporated into steam. In yet another embodiment, the preheated water is fully evaporated into steam and optionally superheated.

The preheated liquid water and/or steam is provided from the output of the cold side of the condenser heat exchanger 284 of the first heat pump 280H via another connecting conduit 292 to the heat exchanger 272. Any remaining liquid water is vaporized and/or the steam may be superheated in the heat exchanger 272 using the heat from the oxygen exhaust. The steam that is provided from the heat exchanger 272 may have any suitable temperature above 120° C., such as from about 130° C. to about 200° C., for example from about 140° C. to about 160° C.

The steam is provided from the heat exchanger 272 into the system steam conduit 230 and then from the system steam conduit 230 into the stacks 100 via respective module steam conduits 130.

The at least one steam source 30 may also include a steam generator 31. The steam generator 31 may comprise a resistively heated vaporizer and may include one zone or multiple zones/elements that may or may not be mechanically separated. For example, the steam generator 31 may include a pre-boiler to heat the water up to, or near to the boiling point. The steam generator 31 may also include a vaporizer configured to convert the pre-boiled water into steam. Alternatively, the steam generator 31 may comprise a building steam generator or an industrial device (e.g., ammonia production plant) which generates steam as a byproduct.

The steam generator 31 may be located fluidly in parallel with the at least one heat pump 280 between the water conduit 260 and the system steam conduit 230. The liquid water from the water conduit 260 is provided into the steam generator 31 via a second branch 260B. A second valve 262B may be located on the second branch 260B to control an amount of water flowing into the steam generator 31. The first and second valves 262A, 262B may be controlled by the system controller 225 to vary the amount of water that is provided from the water source 60 into each of the at least one heat pump 280 and the steam generator 31. For example, during system 300 startup mode when the system 300 is relatively cold, all or a larger portion of the liquid water from the water source 60 is provided to the steam generator 31. Thus, the first valve 262A may be closed or may be open partially, while the second valve 262B may be fully opened during the startup mode. During system 300 steady state operating mode when the system 300 is at its steady state operating temperature, a larger portion of the liquid water from the water source 60 is provided to the at least one heat pump 280 than in the startup mode. Thus, the first valve 262A may be fully opened and the second valve 262B may be partially closed during the steady state operating mode. In various embodiments, the system controller 225 controls the operation of the valves 262A and/or 262B to maintain a desired water and/or steam flow distribution to maintain a desired temperature profile or degree of vaporization in connecting conduits 290 and/or 292. In one embodiment, the steam generator 31 still provides a portion of the steam to the steam conduit 230 in parallel with the at least one heat pump 280 during the steady state operating mode.

The system 300 may also include one or more non-return valves 236 on the steam conduit that are configured to prevent steam from flowing into the heat exchanger 272 and/or the heat pumps 280 from the system steam conduit 230.

Figure 3:
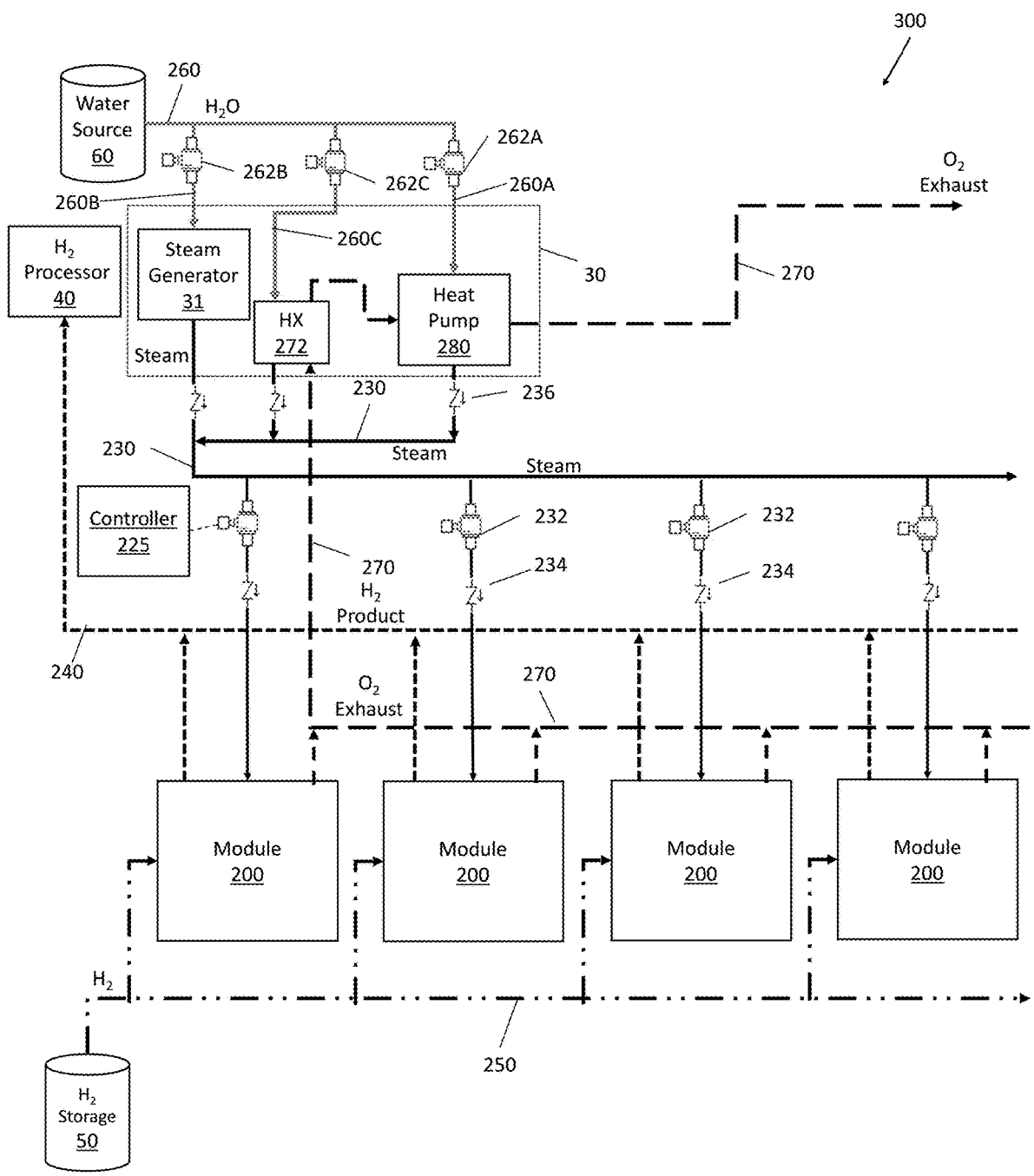
FIG. 3 is a schematic view of an electrolyzer system, according to an alternative embodiment of the present disclosure.

In an alternative embodiment illustrated in FIG. 3, the heat exchanger 272 is located fluidly in parallel with the steam generator 31 and the at least one heat pump 280. In this alternative embodiment, the heat exchanger 272, the steam generator 31 and the at least one heat pump 280 all receive liquid water from the water source 60 and generate steam and provide the generated steam in parallel to the system steam conduit 230. In this embodiment, the water or steam output from at least one heat pump 280 does not flow through the heat exchanger 272.

As shown in FIG. 3, the liquid water from the water conduit 260 is provided into the at least one heat pump 280 via a first branch 260A, into the steam generator 31 via a second branch 260B, and into the heat exchanger 272 via a third branch 260C. A third valve 262C may be located on the third branch 260C to control an amount of water flowing into the heat exchanger 272. The first, second and third valves 262A, 262B, 262C may be controlled by the system controller 225 to vary the amount of water that is provided from the water source 60 into each the at least one heat pump 280, the steam generator 31, and the heat exchanger 272, respectively. For example, during system 300 startup mode when the system 300 is relatively cold, all or a larger portion of the liquid water from the water source 60 is provided to the steam generator 31. Thus, the first valve 262A and the third valve 262C may be closed or may be open partially, while the second valve 262B may be fully opened during the startup mode. During system 300 steady state operating mode when the system 300 is at its steady state operating temperature, a larger portion of the liquid water from the water source 60 is provided to the at least one heat pump 280 and to the heat exchanger 272 than in the startup mode. Thus, the first valve 262A and the third valve 262C may be fully opened and the second valve 262B may be partially closed during the steady state operating mode. In various embodiments, the system controller 225 controls the operation of the valves 262A, 262B and/or 262C to maintain a desired water and/or steam flow distribution to maintain a desired temperature profile or degree of vaporization in various conduits (e.g., 260A, 260B, 260C and/or 230).

According to various embodiments, the amount of steam generated by each heat pump 280H, 280M and the corresponding amount of heat extracted from the oxygen exhaust may be set according to various system characteristics, such as the oxygen exhaust temperature and/or flow rate, the number of included heat pumps 280, and/or a thermal capacity and/or COP of each heat pump 280. For example, the system 300 may include flow regulators, such as water valves 262A-262C, configured to control a mass flow rate of water provided to the heat exchanger 272, to each heat pump 280, and/or to the steam generator 31.

In various embodiments, an electrolyzer system 300 comprises stacks 100 of electrolyzer cells 1 configured receive steam and air, and output a hydrogen product stream and an oxygen exhaust stream; and a first heat pump (280, 280H) configured to extract heat from the oxygen exhaust stream to generate a first portion of the steam provided to the stacks 100.

In various embodiments, the system 300 also comprises a heat exchanger 272 configured to extract heat from the oxygen exhaust stream to generate a second portion of the steam provided to the stacks 100. The system 300 also comprises a steam conduit 230 fluidly connected to a steam outlet of the heat exchanger 272 and to a steam inlet of the stacks 100, and configured to provide the steam to the stacks 100; and an exhaust conduit 270 fluidly connecting an oxygen outlet of the stacks 100 in series to oxygen inlets of the heat exchanger 272 and the first heat pump 280H, and configured to receive the oxygen exhaust stream from the stacks 100. The system further comprises a water conduit 260 fluidly connecting a water source 60 to an inlet of the first heat pump 280H.

In the embodiment of FIG. 3, the water conduit 260 fluidly connects the water source 60 to the inlet of the first heat pump 280 and to an inlet of the heat exchanger 272 in parallel.

In the embodiment of FIG. 2A, the system 300 further comprises a first connecting conduit 292 fluidly connecting a water/steam outlet of the first heat pump 280H to a water/steam inlet of the heat exchanger 272. The heat exchanger 272 is configured to receive liquid water and the first portion of the steam from the first heat pump 280H via the first connecting conduit 292 and to generate the second portion of the steam provided to the stacks 100.

In various embodiments, the system 300 further comprises a second heat pump 280M having a water inlet fluidly connected to the water conduit 260, a water outlet fluidly connected to a water/steam inlet of the first heat pump 280H by a second connecting conduit 290, and an air inlet fluidly connected to the system exhaust conduit 270. The second heat pump 280M is configured to extract heat from the oxygen exhaust stream output from the first heat pump 280H to preheat liquid water provided from the water conduit 260.

In the embodiment of FIG. 2C, the first and second heat pumps (280, 280H, 280M) each comprise: a compressor 286 configured to compress a working fluid; a condenser 284 configured to condense the compressed working fluid; an expansion value 288 configured to lower a pressure of the condensed working fluid; and an evaporator 282 configured to evaporate the lower pressure working fluid. The system exhaust conduit 270 is fluidly connected to the evaporators 282 of the first and second heat pumps. The system steam conduit 230 is fluidly connected to the condensers 284 of the first and second heat pumps.

In various embodiments, the system 300 further comprises a hydrogen processor 40 configured to compress the hydrogen product stream; a system product conduit 240 fluidly connecting the hydrogen processor to the stacks 100, and configured to transfer the hydrogen product stream from the stacks 100 to the hydrogen processor 40; and a steam generator 31 configured to generate a third portion of the steam provided to the system steam conduit 230.

In various embodiments, the system 300 further comprises a plurality of electrolyzer modules 200 that each comprise a hotbox 202 housing at least one of the stacks 100; the stacks 100 comprise solid oxide electrolyzer cell stacks; the system water conduit 260 fluidly connects the water source 60 to the steam generator 31 and the second heat pump 280M in parallel; the system steam conduit 230 fluidly connects inlets of the electrolyzer modules 200 to outlets of the heat exchanger 272 and the steam generator 31; and the system exhaust conduit 270 fluidly connects the outlets of electrolyzer modules 200 to inlets of the heat exchanger 272 and the first and second heat pumps 280H, 280M.

In various embodiments, a method of operating an electrolyzer system 300 comprises providing steam and air to stacks 100 of electrolyzer cells 1 to generate a hydrogen product stream and an oxygen exhaust stream; providing the oxygen exhaust stream and liquid water to a first heat pump (280, 280H); and extracting heat from the oxygen exhaust stream in the first heat pump to generate a first portion of the steam provided to the stacks 100.

In various embodiments, the method further comprises providing the oxygen exhaust stream to a heat exchanger 272, and extracting heat from the oxygen exhaust stream in the heat exchanger 272 to generate a second portion of the steam provided to the stacks 100. The step of providing the oxygen exhaust stream to the first heat pump comprises providing the oxygen exhaust stream from the heat exchanger 272 to the first heat pump (280, 280H).

In the embodiment of FIG. 2A, the method further comprises providing the oxygen exhaust stream from the first heat pump 280H to a second heat pump 280M; providing the liquid water to the second heat pump 280M; preheating the liquid water in the second heat pump 280M; and providing a portion of the preheated liquid water and the first portion of the steam from the first heat pump 280H to the heat exchanger 272. In this embodiment, the step of providing the liquid water to the first heat pump comprises providing the preheated liquid water from the second heat pump 280M to the first heat pump 280H.

In the embodiment of FIG. 2A, the oxygen exhaust stream provided to the heat exchanger 272 has a temperature ranging from about 200° C. to about 250° C.; the oxygen exhaust stream provided from the heat exchanger to the first heat pump 280H has a temperature ranging from about 110° C. to about 130° C.; and the oxygen exhaust stream provided from the first heat pump to the second heat pump 280M has a temperature ranging from about 70° C. to about 90° C. The liquid water provided to the second heat pump 280M has a temperature below 80° C.; the preheated liquid water provided from the second heat pump to the first heat pump 280H has a temperature ranging from about 80° C. to about 100° C.; and the preheated liquid water and the first portion of the steam provided from the first heat pump to the heat exchanger 272 has a temperature ranging from about 110° C. to about 130° C.

In the embodiment of FIG. 3, the method further comprises providing the liquid water to the heat exchanger 272 to generate the second portion of the steam in parallel with the providing the liquid water to first heat pump (280, 280H).

In various embodiments, the method further comprises providing the liquid water to a steam generator 31 to generate a third portion of the steam in parallel with the providing the liquid water to first heat pump (280, 280H). More of the liquid water is provided to the first heat pump during a steady state operating mode of the stacks than during a startup mode of the stacks 100.

In various embodiments, the electrolyzer system 300 further comprises a plurality of electrolyzer modules 200 that each comprise a hotbox 202 housing stacks 100; the stacks 100 comprise solid oxide electrolyzer cell stacks; the steam is provided from the first heat pump (280, 280H) to the plurality of the electrolyzer modules 200; and the oxygen exhaust stream from the stacks 100 is provided from the plurality of the electrolyzer modules 200 to the first heat pump (280, 280H).

It will be apparent to those skilled in the art that various modifications and variations can be made in the heat source for heat pumps and coupling an electrolyzer with heat pumps to combine efficiencies and effectively produce steam for the production of hydrogen without departing from the spirit or scope of the present disclosure. Thus, it is intended that the present disclosure cover the modifications and variations of this invention provided they come within the scope of the appended claims and their equivalents.

Various embodiments of the present disclosure provide a benefit to the climate by reducing greenhouse gas emissions and/or generating carbon-free fuel.

The preceding description of the disclosed aspects is provided to enable any person skilled in the art to make or use the present invention. Various modifications to these aspects will be readily apparent to those skilled in the art, and the working principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. An electrolyzer system, comprising:
   stacks of electrolyzer cells configured receive steam and air, and output a hydrogen product stream and an oxygen exhaust stream;
   a first heat pump configured to extract heat from the oxygen exhaust stream to generate a first portion of the steam provided to the stacks;
   a water conduit fluidly connected to a water source;
   an exhaust conduit fluidly connecting an oxygen outlet of the stacks to an oxygen inlet of the first heat pump, and configured to receive the oxygen exhaust stream from the stacks; and
   a second heat pump having a water inlet fluidly connected to the water conduit, a water outlet fluidly connected to a water inlet of the first heat pump by a second connecting conduit, and an air inlet fluidly connected to the exhaust conduit, wherein the second heat pump is configured to extract heat from the oxygen exhaust stream output from the first heat pump to preheat liquid water provided from the water conduit.

2. The electrolyzer system of claim 1, further comprising a heat exchanger configured to extract heat from the oxygen exhaust stream to generate a second portion of the steam provided to the stacks.

3. The electrolyzer system of claim 2, further comprising:
   a steam conduit fluidly connected to a steam outlet of the heat exchanger and to a steam inlet of the stacks, and configured to provide the steam to the stacks, wherein the exhaust conduit fluidly connects the oxygen outlet of the stacks in series to an oxygen inlet of the heat exchanger and to the oxygen inlet of the first heat pump.

4. The electrolyzer system of claim 3, further comprising a first connecting conduit fluidly connecting a steam outlet of the first heat pump to a water inlet of the heat exchanger, wherein heat exchanger is configured to receive liquid water and the first portion of the steam from the first heat pump via the first connecting conduit and to generate the second portion of the steam provided to the stacks.

5. The electrolyzer system of claim 3, wherein the water conduit fluidly connects the water source to the water inlet of the first heat pump and to a water inlet of the heat exchanger in parallel.

6. The electrolyzer system of claim 3, wherein the first and second heat pumps each comprise:
   a compressor configured to compress a working fluid;
   a condenser configured to condense the compressed working fluid;
   an expansion value configured to lower a pressure of the condensed working fluid; and
   an evaporator configured to evaporate the lowered pressure working fluid.

7. The electrolyzer system of claim 6, wherein:
   the exhaust conduit is fluidly connected to the evaporators of the first and second heat pumps; and
   the steam conduit is fluidly connected to the condensers of the first and second heat pumps.

8. The electrolyzer system of claim 7, further comprising:
   a hydrogen processor configured to compress the hydrogen product stream;
   a product conduit fluidly connecting the hydrogen processor to the stacks, and configured to transfer the hydrogen product stream from the stacks to the hydrogen processor; and
   a steam generator configured to generate a third portion of the steam provided to the steam conduit.

9. The electrolyzer system of claim 8, wherein:
   the electrolyzer system further comprises a plurality of electrolyzer modules that each comprise a hotbox housing at least one of the stacks;
   the stacks comprise solid oxide electrolyzer cell stacks;
   the water conduit fluidly connects the water source to the steam generator and the second heat pump in parallel;
   the steam conduit fluidly connects inlets of the electrolyzer modules to outlets of the heat exchanger and the steam generator; and
   the exhaust conduit fluidly connects the outlets of electrolyzer modules to inlets of the heat exchanger and the first and second heat pumps.

10. A method of operating an electrolyzer system, comprising:
    providing steam and air to stacks of electrolyzer cells to generate and output a hydrogen product steam and an oxygen exhaust stream;

providing the oxygen exhaust stream from an oxygen exhaust of the stacks to an oxygen inlet of a first heat pump through an exhaust conduit;

extracting heat from the oxygen exhaust stream in the first heat pump to generate a first portion of the steam provided to the stacks;

providing the oxygen exhaust stream from the first heat pump to an air inlet of a second heat pump through the exhaust conduit;

providing liquid water from a water source to a water inlet of the second heat pump through a water conduit;

preheating the liquid water in the second heat pump by extracting heat from the oxygen exhaust stream output from the first heat pump; and providing the preheated liquid water from a water outlet of the second heat pump to a water inlet of the first heat pump through a second connecting conduit.

11. The method of claim 10, further comprising:

providing the oxygen exhaust stream to a heat exchanger; and extracting heat from the oxygen exhaust stream in the heat exchanger to generate a second portion of the steam provided to the stacks, wherein the step of providing the oxygen exhaust stream to the first heat pump comprises providing the oxygen exhaust stream from the heat exchanger to the first heat pump.

12. The method of claim 11, further comprising:

providing a portion of the preheated liquid water and the first portion of the steam from the first heat pump to the heat exchanger.

13. The method of claim 12, wherein:

the oxygen exhaust stream provided to the heat exchanger has a temperature ranging from about 200° C. to about 250° C.;

the oxygen exhaust stream provided from the heat exchanger to the first heat pump has a temperature ranging from about 110° C. to about 130° C.; and the oxygen exhaust stream provided from the first heat pump to the second heat pump has a temperature ranging from about 70° C. to about 90° C.

14. The method of claim 13, wherein:

the liquid water provided to the second heat pump has a temperature below 80° C.;

the preheated liquid water provided from the second heat pump to the first heat pump has a temperature ranging from about 80° C. to about 100° C.; and the preheated liquid water and the first portion of the steam provided from the first heat pump to the heat exchanger has a temperature ranging from about 110° C. to about 130° C.

15. The method of claim 11, further comprising providing the liquid water to the heat exchanger to generate the second portion of the steam in parallel with the providing the liquid water to first heat pump.

16. The method of claim 11, further comprising providing the liquid water to a steam generator to generate a third portion of the steam in parallel with the providing the liquid water to first heat pump.

17. The method of claim 16, wherein more of the liquid water is provided to the first heat pump during a steady state operating mode of the stacks than during a startup mode of the stacks.

18. The method of claim 10, wherein:

the electrolyzer system further comprises a plurality of electrolyzer modules that each comprise a hotbox housing at least one of the stacks;

the stacks comprise solid oxide electrolyzer cell stacks;

the steam is provided from the first heat pump to the plurality of the electrolyzer modules; and the oxygen exhaust stream is provided from the plurality of the electrolyzer modules to the first heat pump.

19. An electrolyzer system, comprising:

stacks of electrolyzer cells configured receive steam and air, and output a hydrogen product stream and an oxygen exhaust stream;

a first heat pump configured to extract heat from the oxygen exhaust stream to generate a first portion of the steam provided to the stacks;

a heat exchanger configured to extract heat from the oxygen exhaust stream to generate a second portion of the steam provided to the stacks;

a steam conduit fluidly connected to a steam outlet of the heat exchanger and to a steam inlet of the stacks, and configured to provide the steam to the stacks;

an exhaust conduit fluidly connecting an oxygen outlet of the stacks in series to oxygen inlets of the heat exchanger and the first heat pump, and configured to receive the oxygen exhaust stream from the stacks;

a water conduit fluidly connecting a water source to an inlet of the first heat pump; and a second heat pump having a water inlet fluidly connected to the water conduit, a water outlet fluidly connected to a water inlet of the first heat pump by a second connecting conduit, and an air inlet fluidly connected to the exhaust conduit, wherein the second heat pump is configured to extract heat from the oxygen exhaust stream output from the first heat pump to preheat liquid water provided from the water conduit.

20. The electrolyzer system of claim 19, wherein the first and second heat pumps each comprise:

a compressor configured to compress a working fluid;

a condenser configured to condense the compressed working fluid;

an expansion value configured to lower a pressure of the condensed working fluid; and an evaporator configured to evaporate the lowered pressure working fluid.

* * * * *